F. WEBER.
REEL.
APPLICATION FILED SEPT. 22, 1916.
1,237,730.
Patented Aug. 21, 1917.
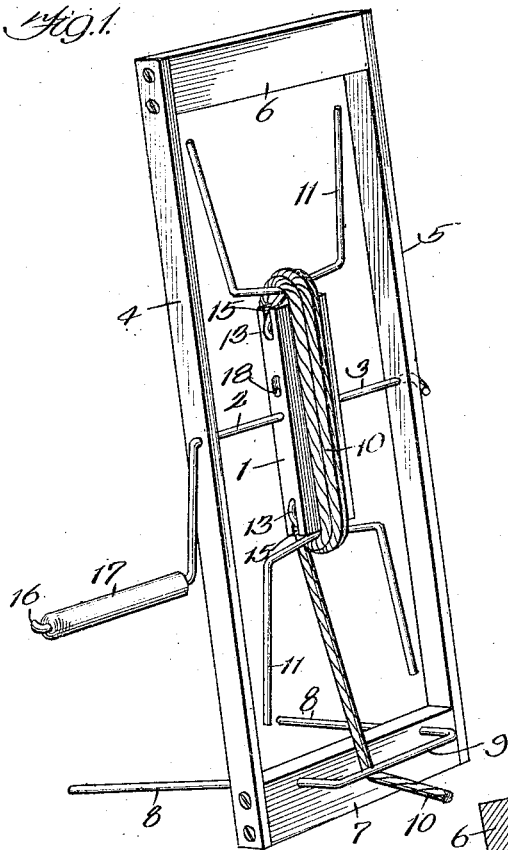
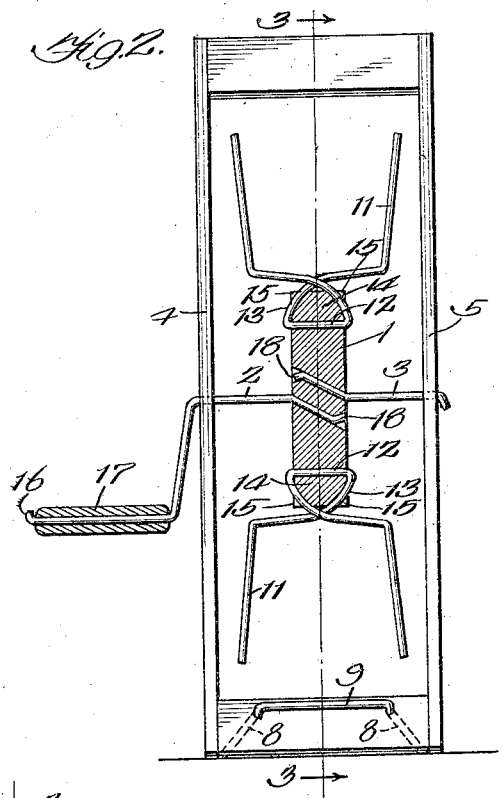
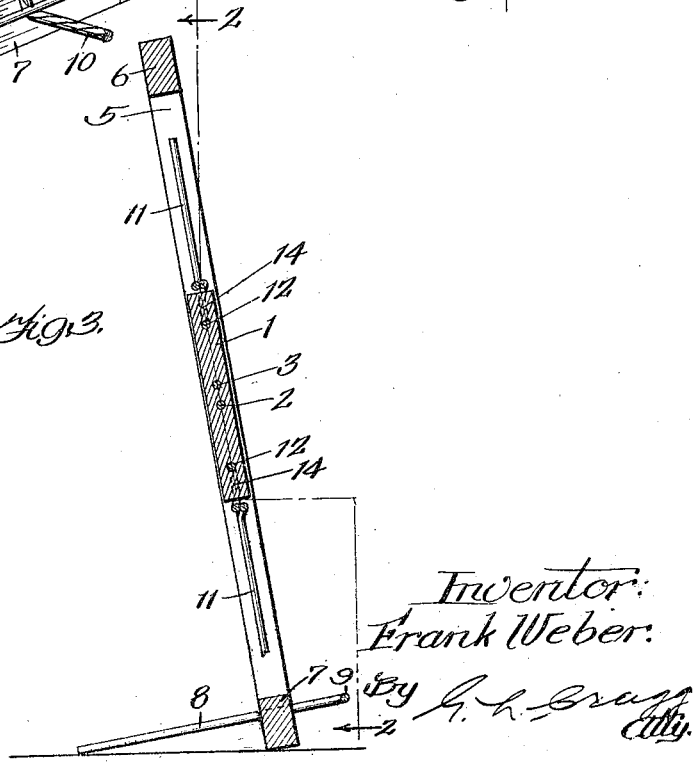
Inventor:
Frank Weber

UNITED STATES PATENT OFFICE.

FRANK WEBER, OF CHICAGO, ILLINOIS.

REEL.

1,237,730.  Specification of Letters Patent.  Patented Aug. 21, 1917.

Application filed September 22, 1916. Serial No. 121,601.

*To all whom it may concern:*

Be it known that I, FRANK WEBER, citizen of the United States, residing at Chicago, in the county of Cook and State of Illinois, have invented a certain new and useful Improvement in Reels, of which the following is a full, clear, concise, and exact description, reference being had to the accompanying drawings, forming a part of this specification.

My invention relates to reels and has been designed especially for the winding of clothes line, though the invention is not to be limited to any use to which it may be put.

My invention has among its objects the construction of a reel which may be held by one hand while being operated by the other; whereby the reel may be rested upon the ground in an upright position to keep the rope wound thereon clean and to keep the reel in a position in which it may readily be taken up again for use; the provision of a guide for the rope being wound upon the real block whereby the rope is positively led or directed into the winding space of the reel irrespective of the position in which the reel may be held; the employment of a pedestal member for the reel which enables it to be placed upon the ground in an upright position and part of which constitutes the guide for the rope; the formation of the reel hand crank shaft in sections either or both of which are secured to the reel block to prevent endwise movement of the reel block along the shaft; and the definition of the winding space by means of U-shaped wire members that are passed through holes in the ends of the reel block and are preferably wound around the ends of the reel block in a manner to form eyes by which these wire members are held in place.

I will explain my invention more fully by reference to the accompanying drawing in which Figure 1 is a perspective view of the reel constructed in accordance with the invention; Fig. 2 is a view on line 2 2 of Fig. 3; and Fig. 3 is a view on line 3 3 of Fig. 2.

Like parts are indicated by similar characters of reference throughout the different figures.

The reel block 1 has a shaft formed in two sections 2 and 3 which are respectively journaled in the side members 4 and 5 of the reel frame which is preferably rectangular. The end rails 6, 7 of the reel frame connect the side rails 4 and 5, the end rail 6 being desirably a gripping piece by which the reel may be carried in one hand and may be operated (while carried in one hand) by the other. The end rail 7 supports the pedestal member 8 which is preferably a piece of wire bent into U-shape with the base 9 of the U substantially straight and far enough away from the rail 7 to afford a guiding space through which the rope 10 is passed as it is being wound upon the reel block. The pedestal member 8 may be at right angles to the reel frame but, as it passes through the reel member 7 considerably above the bottom edge thereof, the whole reel structure, when resting upon the ground, will tilt so as to overlie the part of the pedestal member that rests upon the ground. In this way the center of gravity of the structure overlies the space between the bottom rail 7 and the points of the U-shaped pedestal member 8 that rest upon the ground, an arrangement that will keep the reel structure stable when standing. The winding space for the rope is desirably defined by two wire U-shaped members 11. Each of these U-shaped members 11 is desirably initially of straight wire that is passed through a hole 12 extending through the reel block 1 parallel to the axis of rotation of this reel block, the wire being passed through or contained within opening in the reel block until the middle of the wire engages the reel block, whereafter each portion of the wire projecting beyond the reel block is wound around the adjacent end of the reel block to extend on the other side of the reel block whereby an eye 13 is formed through which the portion 14 of the reel block passes. The corner portions 15 of the reel block are desirably recessed so that the eye 13 may enter the same. By this construction each U-shaped member 11 is held in fixed relation to the reel block to define the winding space which the reel block is to afford. Each winding space defining member 11 is wider, at its outer extremity, than the guiding space defined by the element 9 and the base rail 7 of the reel frame.

The hand crank shaft is desirably formed of wire and the section 2 thereof is offset upon the exterior of the reel frame and is bent to form the crank 16, this crank desirably being surrounded by a wooden handle 17 that may turn with respect to the crank 16. The inner ends of the shaft sections overlie and extend through the block obliquely to the axis of rotation of the block, the inner ends of the shaft sections being desirably bent inwardly or clenched at 18 whereby the reel block and the shaft are in rigid relation. Suitable holes, oblique with respect to the axis of rotation of the reel block, are formed through the block for the reception of the inner ends of the shaft sections 2 and 3 (which are then straight), the shaft sections being bent over at 18 after they are received within said holes.

The reel block, reel frame, and handle 17 are preferably made of wood while the balance of the structure is desirably made of wire, the result being a very substantial, cheap and readily operable reel which may readily be used by the housewife for holding a clothes line.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A reel including a reel block; a rectangular reel frame in whose side rails the reel block is mounted to turn, one of the end rails of this frame being adapted to be held in the hand; and a pedestal portion carried at the other end of the reel frame, this pedestal portion being in the form of a U-shaped member whose base is sufficiently spaced apart from the adjacent end of the reel frame to form a guide to the reel winding space.

2. A reel including a reel frame; a reel block; and a shaft supported in opposite sides of the reel frame and formed in sections that are secured to the reel block at their inner end portions which are passed through adjacent holes which are extended through the reel block obliquely to its axis of rotation, the inner ends of said shaft sections being clenched into engagement with said block.

3. A reel including a reel frame; a reel block; and a shaft supported in opposite sides of the reel frame and formed in sections that are secured to the reel block at their inner end portions which are passed through adjacent holes which are extended through the reel block obliquely to its axis of rotation.

4. A reel including a reel frame; a reel block; a shaft supported in opposite sides of the reel frame and formed in sections that are secured to the reel block at their inner end portions which are passed into the reel block obliquely to its axis of rotation.

5. A reel including a reel frame; a reel block mounted to turn in said frame; and means carried upon each end of the reel block for defining the reel winding space, the means upon one of the ends of the reel block comprising a wire member passed through the reel block and wrapped around such end of the reel block to form an eye at the middle portion of said wire member, corner portions of the reel block being recessed to receive the eye.

6. A reel including a reel frame; a reel block mounted to turn in said frame; and means carried upon each end of the reel block for defining the reel winding space, the means upon one of the ends of the reel block comprising a wire member passed through the reel block and wrapped around such end of the reel block to form an eye at the middle portion of said wire member.

7. A reel including a reel frame; a reel block having shaft containing openings therein; and a shaft supported in opposite sides of the reel frame and formed in sections that are contained in said openings in said reel block and which shaft sections are secured to the reel block at their inner ends.

8. A reel including a reel block; a reel frame in whose sides the reel block is mounted to turn, one end of the frame being adapted to be held in the hand; and a pedestal carried at the other end of the reel frame comprising a support and also constituting a guide for the rope or string that is being wound upon the reel.

In witness whereof, I hereunto subscribe my name this twentieth day of September, A. D., 1916.

FRANK WEBER.

Witnesses:
G. L. CRAGG,
ETTA L. WHITE.